(12) United States Patent
Choi et al.

(10) Patent No.: US 8,242,758 B2
(45) Date of Patent: Aug. 14, 2012

(54) CONVERTER AND DRIVING METHOD THEREOF

(75) Inventors: Hang-Seok Choi, Gunpo (KR);
Gwan-Bon Koo, Bucheon (KR);
Young-Bae Park, Anyang (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 503 days.

(21) Appl. No.: 12/344,041

(22) Filed: Dec. 24, 2008

(65) Prior Publication Data
US 2009/0206805 A1    Aug. 20, 2009

(30) Foreign Application Priority Data

Feb. 20, 2008 (KR) .................. 10-2008-0015509

(51) Int. Cl.
*G05F 1/00* (2006.01)
*H02M 7/08* (2006.01)
(52) U.S. Cl. ........................ 323/272; 363/69
(58) Field of Classification Search .......... 323/271, 323/272; 363/69
See application file for complete search history.

(56) References Cited

U.S. PATENT DOCUMENTS

| 4,174,534 A * | 11/1979 | Kotlarewsky .................. 363/72 |
| 5,905,369 A | 5/1999 | Ishii et al. |
| 6,292,378 B1 * | 9/2001 | Brooks et al. ................. 323/272 |
| 2006/0139016 A1 * | 6/2006 | Schuellein et al. ........... 323/272 |
| 2007/0013353 A1 * | 1/2007 | Noma ........................... 323/284 |

* cited by examiner

*Primary Examiner* — Jue Zhang
(74) *Attorney, Agent, or Firm* — Sidley Austin LLP

(57) ABSTRACT

The present invention relates to a converter and a driving method thereof. The converter includes a switch controller that controls switching operation of a master switch and a slave switch. The switch controller detects a center point of one switching operation period of the master switch by using an internal triangular wave having a period that is the same as that of the one switching operation period, and starts the switching operation of the slave switch at the detected point. The internal triangular wave signal has a waveform that varies within one period, and detects a crossing point of an average value of the internal triangular wave and the internal triangular wave as a center point of one switching operation period of the master switch.

22 Claims, 6 Drawing Sheets

CONVERTER AND DRIVING METHOD THEREOF

CROSS-REFERENCE TO RELATED APPLICATION

This application claims priority to and the benefit of Korean Patent Application No. 10-2008-0015509 filed in the Korean Intellectual Property Office on Feb. 20, 2008, the entire contents of which are incorporated herein by reference.

BACKGROUND

1. Field of the Invention

The present invention relates to a converter and a driving method thereof. Particularly, it relates to an interleaved converter formed by connecting two converters in parallel and having one input terminal and one output terminal by respectively connecting input terminals and output terminals of the two converters, and a driving method of the interleaved converter.

2. Description of the Related Art

FIG. 1 shows a conventional converter. The conventional converter includes an inductor 900, a switch 901, a diode 902, and a capacitor 903. An inductor current iL flows through the inductor 900 according to an input voltage Vin and an output power, and charges the capacitor 903. A voltage charged into the capacitor 903 becomes an output voltage of the converter. In the interval when the switch 901 is in the turn-on state and the diode 902 is in the turn-off state, the inductor current iL increases as time passes, and the inductor 900 stores energy. In the interval when the switch is turned off and the diode is turned on, the inductor current iL charges the capacitor 903 through the diode 902. In this interval, the energy stored in the inductor 900 is transmitted to the capacitor 903, and the inductor current iL decreases as time passes.

A driving mode of a converter can be classified into a continuous conduction mode (CCM), a discontinuous conduction mode (DCM), and a boundary conduction mode (BCM) according to current waveforms flowing through an inductor. In the CCM, the inductor current of the converter continuously flows for one switching period. In the DCM, there is an interval during which the inductor current of the converter does not flow within one switching period. In the BCM, the switch is turned on at the time when the inductor current becomes zero. In the CCM, a reverse recovery current flows when the diode is turned off. In the DCM and BCM, the switch is turned on when the inductor current is zero, and thus no reverse recovery current is generated. Accordingly, a diode loss energy in the DCM and BCM is lower than that in the CCM.

In general, BCM is preferred than DCM since the non-conducting period of the inductor current cause line current distortion. In BCM operation, the switch is turned on at the moment when the inductor current reaches zero. If the switch conduction time is fixed, the peak current becomes proportional to the input voltage. Since the average of inductor current is half of the peak value, the average of inductor current naturally follows the shape of line voltage and the sinusoidal input current is obtained. The inductor size can be also reduced with BCM operation since the inductance value can be much smaller than that of CCM operation.

Even though the BCM operation has a lot of advantages such as simple control and less reverse recovery loss, the high RMS current causes high conduction losses in the inductor and switching device. The line filter size also should be much bigger than that of CCM PFC converter due to high ripple current. Therefore, BCM PFC converter has been applied relatively low power application below 200W. Considering the overall system size and power conversion efficiency, using BCM PFC for power level above 200W has practically has no merit. In order to overcome this drawback and apply BCM for higher power level, in some designs, two converters operated in the BCM are controlled to have a phase difference of 180 degrees. In this design the ripples flowing through the inductors of the two converters cancel each other so that the current ripple at the input terminal can be reduced, as in the CCM. Such a driving method is called interleaved driving.

In the interleaved driving, a master-slave method is most generally used. A master converter independently operates at the BCM, and a control circuit of the master converter detects a time when an inductor current becomes zero by observing an inductor voltage and turns on a switch (hereinafter referred to as a master switch) of the master converter. A control circuit of the slave converter calculates a center point of one switching operation period of the master converter, and turns on a switch (hereinafter referred to as a slave switch) of the slave converter. In this instance, both of the two converters can be operated in the BCM by controlling the turn-on times of the master and slave switches.

However, the master-slave designs can have a problem in that the center point of any specific switching operation period of the master switch can be detected only after the specific switching operation period is fully observed. In other words, the center point of the specific switching operation period of the master switch cannot be detected until the specific switching operation period of the master switch is fully observed. Another problem is that a switching operation period of the master switch operated at the BCM continuously varies according to the operation conditions of the converter, including the input voltage and output power, and therefore it is difficult to precisely detect a center point of the one switching operation period of the master switch.

This problem can be solved e.g. by using a previous switching operation period of the master switch since the switching frequency changes slowly according to the 60 Hz line frequency and the previous switching operation period is typically similar to the one switching operation period. Therefore, a converter using a conventional interleaved method remembers a previous switching operation period by using a sample and hold circuit and uses the previous switching operation period for determining a center point of the next switching operation period. The conventional interleaved converter has, however, a disadvantageously complicated circuit structure since it uses the sample and hold circuit to retain the information regarding the previous switching cycle.

The above information disclosed in this Background section is only for enhancement of understanding of the background of the invention and therefore it may contain information that does not form the prior art that is already known in this country to a person of ordinary skill in the art.

SUMMARY

Briefly and generally, embodiments of the present invention include a converter and a driving method thereof for precisely detecting a center point of one switching operation period of a master switch by using a simpler circuit than a conventional converter.

In addition, the present invention provides a converter and a driving method thereof that can precisely detect a center point of one switching operation period of a master switch, and control a phase difference between a switching operation of the master switch and a switching operation of a slave switch to be 180 degrees.

An exemplary converter according to an embodiment of the present invention includes a first inductor, a second inductor, a capacitive element, a master switch, a slave switch, and a switch controller. The master switch transmits a current flowing through the first inductor to the capacitive element according to a switching operation. The slave switch transmits a current flowing through the second inductor to the capacitive element according to a switching operation. The switch controller controls the switching operation of the master and slave switches, and includes a master controller and a slave controller. The master controller controls the switching operation of the master switch. The slave controller controls the switching operation of the slave switch, and detects a center point of one switching operation period of the master switch by using an internal triangular wave that has the same period of the switching operation period of the master switch, and turns on the slave switch at the detected point. The internal triangular wave has a waveform that varies within one period, and the slave controller detects a crossing point of an average value of the internal triangular wave and the internal triangular wave as the center point of the one switching operation of the master switch. The slave controller calculates the average value by low-passing the internal triangular wave.

The master controller of the converter generates a detection voltage by detecting a voltage induced to the first inductor, turns on the master switch when the detection voltage falls below zero, calculates an error voltage by comparing a division voltage that corresponds to a voltage of the capacitive element and a predetermined reference voltage, and turns off the master switch when a first triangular wave having a same period as the master switch switching period reaches the error voltage. The switch controller further includes an error voltage generation unit and a triangular wave generation unit. The error voltage generation unit amplifies a difference between the reference voltage and the division voltage with a predetermined gain and outputs the amplified result, and the triangular wave generation unit generates the first triangular wave. The triangular wave generation unit generates the first triangular wave that is synchronized when the master switch is turned on, and starts to increase. The master controller includes a zero voltage detection unit, a logical operation unit, an SR flip-flop, and a master gate driver. The zero voltage detection unit receives the detection voltage and detects a time point that the detection voltage falls below zero, and generates a high-level pulse at the detected time point. The logical operation unit receives an output signal of the zero voltage detection unit and outputs a signal of a level that corresponds to the output signal of the zero voltage detection unit. The SR flip-flop has a set terminal to which the output signal of the logical operation unit is input and a reset terminal to which an output signal that corresponds to a result of the comparison between the first triangular wave and the error voltage is input, and generates a first gate driver control signal according to the signals input to the set and reset terminals. The master gate driver generates a first gate signal that controls turn-on/off of the master switch according to the first gate driver control signal. The master controller further includes a first comparator having a non-inversion terminal to which the first triangular wave is input and an inversion terminal to which the error voltage is input. The internal triangular wave has a waveform that varies within one period, and the slave controller detects a crossing point of an average value of the internal triangular wave and the internal triangular wave as a center point of one switching operation period of the master switch. The slave controller calculates the average value by low-passing the internal triangular wave. The slave controller turns on the slave switch at the crossing point of the average value of the internal triangular wave and the internal triangular wave, compares a second triangular wave having a same period as slave switch switching period and the error voltage, and turns off the slave switch when the second triangular wave reaches error voltage. The switch controller further includes an error voltage generation unit and a triangular wave generation unit. The error voltage generation unit amplifies a difference between the reference voltage and the division voltage with a predetermined gain, and outputs the amplified result. The triangular wave generation unit generates the second triangular wave. The triangular wave generation unit generates the second triangular wave that is synchronized when the slave switch is turned on and starts to increase. The slave controller includes a one-shot vibrator, an internal triangular wave generation unit, a low-pass filter, a second comparator, an SR flip-flop, and a slave gate driver. The one-shot vibrator is synchronized by the first gate driver control signal that turns on the master switch, and generates a pulse signal. The internal triangular wave generation unit is synchronized by the pulse signal of the one-shot vibrator, and generates an internal triangular wave that increases for one switching operation period of the master switch. The low-pass filter calculates the average value of the internal triangular wave value by low-passing the internal triangular wave. The second comparator outputs a first-level signal when the internal triangular wave crosses the average value. The SR flip-flop has a set terminal to which an output signal of the second comparator is input and a reset terminal to which an output signal that corresponds to a result of the comparison between the second triangular wave and the error voltage, and generates a second gate driver control signal according to the signals input to the set terminal and the reset terminal. The slave gate driver generates a second gate signal that controls turn-on/off of the slave switch according to the second gate driver control signal. The one-shot vibrator includes a transistor, a capacitor, and a constant current source. The transistor has a gate electrode to which the first gate driver control signal that turns on the master switch is input. The capacitor is connected with drain and source electrodes of the transistor in parallel. The constant current source supplies a current to the capacitor. The slave controller further includes a second comparator having a non-inversion terminal to which the second triangular wave is input and an inversion terminal to which the error voltage is input.

An exemplary driving method according to another embodiment of the present invention drives a converter having a first inductor, a second inductor, a capacitive element, a master switch that transmits a current flowing through the first inductor to the capacitive element according to a switching operation, and a slave switch that transmits a current flowing through the second inductor to the capacitive element according to a switching operation. The driving method includes: generating an internal triangular wave having a period that is the same as one switching operation period of the master switch; detecting a center point of the one switching operation period by using the internal triangular wave; and starting a switching operation of the slave switch at the detected point. The internal triangular signal has a waveform that varies within one period, and the detecting of the center point of the one switching operation period includes detecting a crossing point of an average value of the internal triangular wave and the internal triangular wave. The detecting of the center point of the one switching operation period further includes calculating the average value by low-passing the internal triangular wave. The driving method further includes: generating a detection voltage by detecting a voltage induced to the first inductor, and turning on the master switch when the detection voltage becomes zero; calculating an error voltage by comparing a division voltage that corresponds to a voltage of the capacitive element and a predetermined reference voltage; and turning off the master switch when a first triangular wave having a same period as master switch switching period reaches error voltage. The driving method further includes generating the first triangular wave that is synchronized and starts to increase when the master switch is turned on and The internal triangular wave has a waveform that varies within one period, and the detecting of the center point of the one switching operation period includes detecting a crossing point of an average value of the internal triangular wave and the internal triangular wave. The detecting of the center point of the one switching operation period further includes calculating the average value by low-passing the internal triangular wave. The driving method further includes turning on the slave switch at the crossing point of the average value of the internal triangular wave and the internal triangular wave, and comparing a second triangular wave having a same period as the slave switch switching period and the error voltage, and turning off the slave switch when the second triangular wave reaches the error voltage.

The present invention provides a converter and a driving method that uses a simple low frequency pass filter rather that using a sample and hold circuit. Thus, a circuit that controls master and slave switches becomes more simple that a conventional circuit.

In addition, the converter and the driving method thereof can control a phase difference of a switching operation of the master switch and a switching operation of the slave switch to be 180 degrees.

DETAILED DESCRIPTION

In the following detailed description, only certain exemplary embodiments of the present invention have been shown and described, simply by way of illustration.

Throughout this specification and the claims that follow, when it is described that an element is "coupled" to another element, the element may be "directly coupled" to the other element or "electrically coupled" to the other element through a third element.

Figure 1:
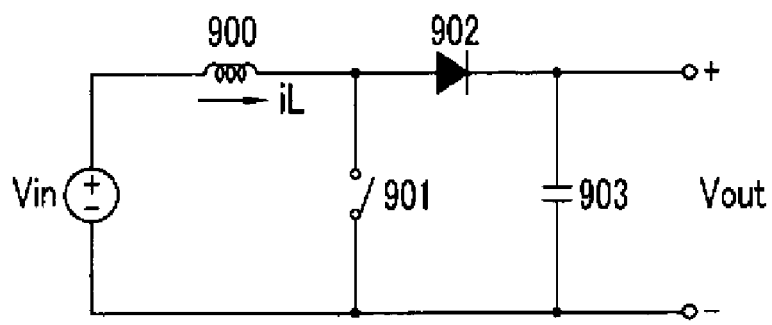
FIG. 1 illustrates a conventional converter.
Figure 2:
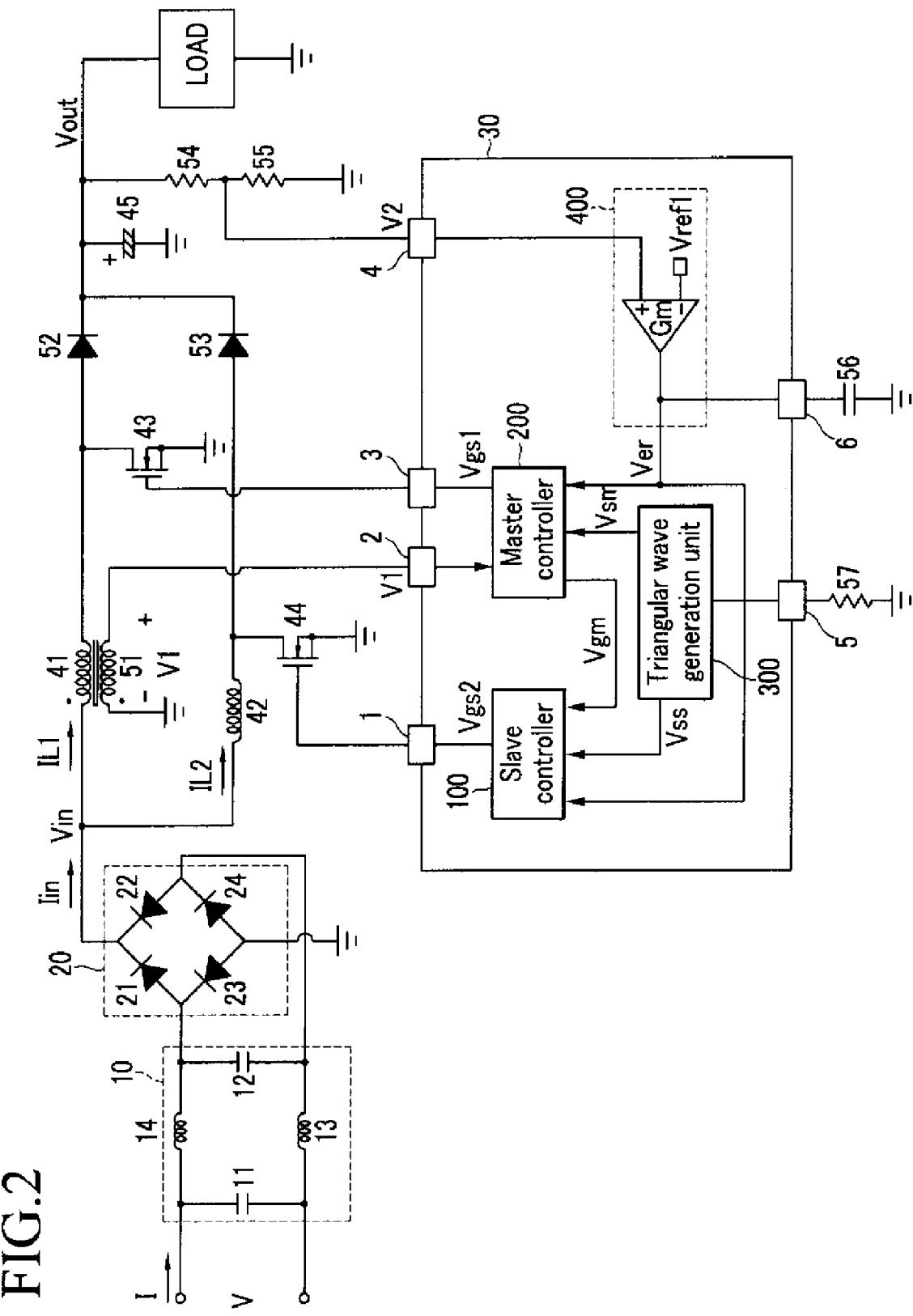
FIG. 2 shows a converter according to an exemplary embodiment of the present invention.

FIG. 2 illustrates a converter including a line filter 10, a bridge diode 20, a first inductor 41, a second inductor 42, a master switch 43, a slave switch 44, a capacitor 45, a detection inductor 51, a first diode 52, a second diode 53, output voltage division resistors 54 and 55, and a switch controller 30.

The line filter 10 can be formed of capacitors 11 and 12, and inductors 13 and 14, and is capable of removing noise components of an input AC voltage Vac and an input AC current Iac. The capacitor 11 and the capacitor 12 can be connected in parallel, the inductor 13 can be connected between a first terminal of the capacitor 11 and a first terminal of the capacitor 12, and the inductor 14 can be connected between a second terminal of the capacitor 11 and a second terminal of the capacitor 12.

The bridge diode 20 can be formed of four diodes 21 to 24, and can generate an input voltage Vin and an input current Iin by performing full-wave rectification on the input AC voltage Vac and the input AC current Iac.

A first terminal of the first inductor 41 can be connected to an output terminal of the bridge diode 20, and a second terminal of the first inductor 41 can be connected to the master switch 43 and an anode of the first diode 52.

A first terminal of the second inductor 42 can be connected to the output terminal of the bridge diode 20, and a second terminal of the second inductor 42 can be connected to the slave switch 44 and an anode of the second diode 53.

The detection inductor 51 can have a predetermined turn ratio compared to the first inductor 41. A voltage induced in the first inductor 41 can change in accordance with the turn ratio and induced in the detection inductor 51 as a detection voltage. The detection voltage induced in the detection inductor 51 can be used for controlling a zero voltage switching operation. In some embodiments the turn ratio of the detection inductor 51 and the first inductor 41 can be 1:1. In other embodiments, this ratio can be different.

The master switch 43 can be formed of an n-channel metal oxide semiconductor filed effect transistor (NMOSFET), and can be turned on/off according to a gate control signal Vgs1 of the switch controller 30. A drain electrode of the master switch 43 can be connected to the anode of the first diode 52 and the second terminal of the first inductor 41, and a source electrode thereof can be grounded.

The slave switch 44 can be formed of an NMOSFET, and can be turned on/off according to a gate control signal Vgs2 of the switch controller 30. A drain electrode of the slave switch 44 can be connected to the anode of the second diode 53 and the second terminal of the second inductor 42, and a source electrode thereof can be grounded.

Cathode electrodes of the first and second diodes 52 and 53 are connected to a first terminal of the capacitor 45. When the master switch 43 is turned off, a first inductor current IL1 flows through the first diode 52, and when the slave switch 44 is turned off, a second inductor current IL2 flows through the second diode 53. The first inductor current IL1 and the second inductor current IL2 are combined and supplied to the capacitor 45 and to a LOAD of an output terminal through a single path.

While the first and second inductor currents IL1 and IL2 respectively flow through the first and second diodes 52 and 53, the capacitor 45 can be charged by a portion of the first and second inductor currents IL1 and IL2. The capacitor 45 can be discharged for a period during which the first and second diodes 52 and 53 are turned off and the first and second inductor currents IL1 and IL2 do not flow, and can supply power to the load.

The division resistors 54 and 55 can generate a division voltage Vs by voltage-dividing an output voltage Vout, and the division voltage V2 is input to the switch controller 30.

The switch controller 30 can receive a detection voltage V1 and the division voltage V2, and generate the first gate control signal Vgs1 and the second gate control signal Vgs2. The switch controller 30 can include a master controller 200, a slave controller 100, a triangular wave generation unit 300, and an error voltage generator 400. The switch controller 30 can be realized in an integrated circuit that includes connection terminals 1 to 6. The connection terminals 3 and 1 can be connected to gate electrodes of the master switch 43 and the slave switch 44, respectively. The connection terminal 2 can be connected to a first terminal of the detection inductor 51, and the detection voltage V1 can be input to the master controller 200 through the connection terminal 2. The connection terminal 4 can be connected to a node of the resistor 54 and the resistor 55, and the division voltage V2 can be input to the error voltage generator 400 within the switch controller through the connection terminal 4. A capacitor 56 connected through the connection terminal 6 can be connected to the error voltage generator 400 and maintain an error voltage Ver at a constant level.

The error voltage generator 400 can generate the error voltage Ver by amplifying a difference between a reference voltage Vref1 and the division voltage V2 with a predetermined gain Gm. The error voltage Ver can vary according to an output load so that the division voltage V2 decreases and the error voltage Ver increases when the load increases.

A resistor 57 connected through the connection terminal 5 may generate a predetermined voltage, as described later, together with the triangular wave generation unit 300.

Figure 3:
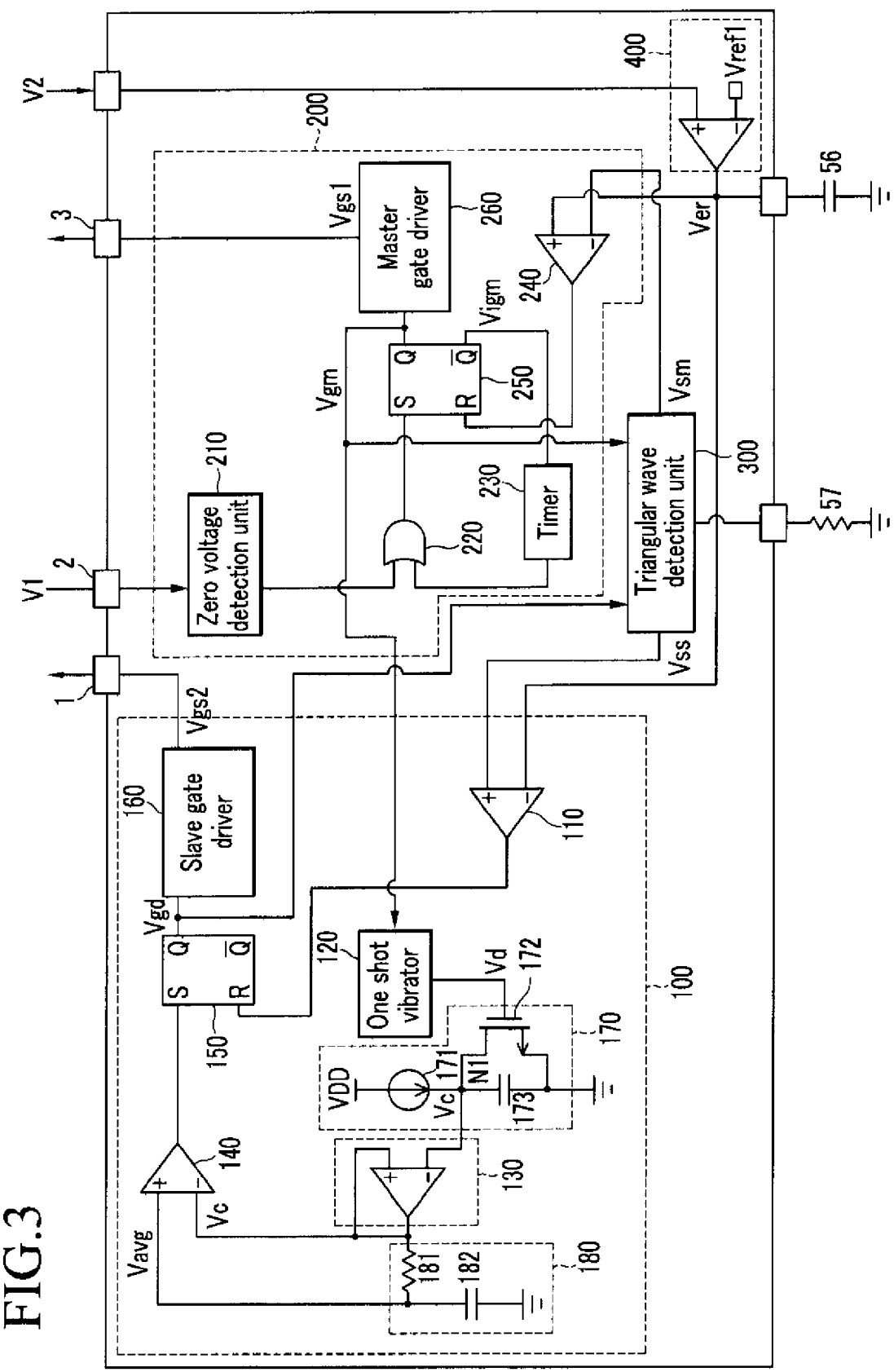
FIG. 3 shows a switch controller 30 according to the exemplary embodiment of the present invention in detail.

FIG. 3 illustrates the master controller 200, the slave controller 100 and the triangular wave generation unit 300.

FIG. 3 illustrates that is some embodiments of the switch controller 30, the master controller 200 can include a zero voltage detection unit 210, an OR gate 220, a timer 230, a first comparator 240, an SR flip-flop 250, and a master gate driver 260.

The zero voltage detection unit 210 may detect a time when the detection voltage V1 is reduced to zero. When the detection voltage V1 becomes zero, the zero voltage detection unit 210 may transmit a pulse signal of a high level to the OR gate 220.

The OR gate 220 may include two input terminals and one output terminal. The two input terminals can be connected to the zero voltage detection unit 210 and the timer 230, respectively, and the output terminal can be connected to a set terminal S of the SR flip-flop 250.

The timer 230 can be connected to an inversion output terminal $\overline{Q}$ of the SR flip-flop 250, and can detect an inversion gate driver control signal Vigm output through the invert output terminal $\overline{Q}$. The timer 230 can calculate a switching operation stop period of the master switch 43 by using the inversion gate driver control signal Vigm. If the switching operation stop period of the master switch 43 is longer than a predetermined period, the timer 230 may output a high-level signal to the OR gate 220 in order to forcibly turn on the master switch 43.

The first comparator 240 can receive a first triangular wave Vsm of the triangular wave generation unit 300 through an inverting terminal (−) and the error voltage Ver through a non-inverting terminal (+), and output a high-level signal when the first triangular wave Vsm exceeds the error voltage Ver.

The OR gate 220 can output a high-level signal to the set terminal S of the SR flip-flop 250 if at least one of the two input signals is a high-level signal.

The SR flip-flop 250 may output a gate driver control signal Vgm and an inversion gate driver control signal Vigm through the output terminal Q and the inversion output terminal $\overline{Q}$, respectively, according to signals input to the set terminal S and a reset terminal R. When a high-level signal is input to the set terminal S, a high-level gate driver control signal Vgm is output to the output terminal Q and a low-level gate driver control signal Vigm is output through the inversion output terminal $\overline{Q}$. When a high-level signal is input to the reset terminal R, a low-level gate driver control signal Vgm is output through the output terminal Q and a high-level gate driver control signal Vigm is output through the inversion output terminal $\overline{Q}$. The SR flip-flop 250 can maintain an output when low-level signals are respectively input to the set terminal S and the reset terminal R.

The master gate driver 260 may generate a first gate control signal Vgs1 that controls the turn-on/off of the master switch 43 according to the gate driver control signal Vgm and outputs the first gate control signal Vgs1. If the gate driver control signal Vgm is a high-level signal, the master gate driver 260 can generate and output a high-level first gate control signal Vgs1 for turning on the master switch 43. When the gate driver control signal Vgm is a low-level signal, the master gate driver 260 can generate and output a low-level first gate control signal Vgs1 for turning off the master switch 43.

The slave controller 100 may include a second comparator 110, a one-shot vibrator 120, a voltage follower 130, a third comparator 140, an SR flip-flop 150, a slave gate driver 160, an internal triangular wave generation unit 170, and a low pass filter 180. The slave controller 100 can receive the gate driver control signal Vgm of the master controller 200 and detect one switching operation period of the master switch 43. In addition, the slave controller 100 can calculate an average value by using an internal triangular wave Vc that rises during one switching operation period of the master switch 43, and detect a middle point of the one switching operation period of the master switch 43 by using a crossing point of the average value and the triangular wave Vc.

The second comparator 110 may receive a second triangular wave Vss and the error voltage Ver respectively through a non-inversion terminal (+) and an inversion terminal (−), and output a high-level signal when the second triangular wave Vss reaches the error voltage Ver.

The one-shot vibrator 120 may receive the gate driver control signal Vgm, which can be synchronized when the gate driver control signal Vgm becomes a high level, and output a high-level pulse signal Vb.

The internal triangular wave generation unit 170 can include a current source 171, an NMOSFET 172, and a capacitor 173. The NMOSFET 172 can be turned on when the pulse signal Vb is input, and form a discharge path through which charges charged in the capacitor 173 are discharged. When the NMOSFET 172 is turned off, the capacitor 173 can be charged by a current of the current source 171, and a voltage at a node N1 can be increased with a slope that corresponds to the intensity of the current of the current source 171. A voltage signal of the node N1 then becomes the internal triangular wave Vc.

The voltage follower 130 may receive the internal triangular wave Vc, and transmit the internal triangular wave to the low pass filter 180.

The low pass filter 180 may include a resistor 181 and a capacitor 182. The low pass filter 180 can generate an average voltage Vavg of the internal triangular wave Vc.

The third comparator 140 can receive the internal triangular wave Vc and the average voltage Vavg respectively through a non-inverting terminal (+) and an inverting terminal (−), and output a high-level signal when the internal triangular wave Vc reaches the average voltage Vavg.

A set terminal S of the SR flip-flop 150 can be connected to an output terminal of the third comparator 140, and a reset terminal R thereof can be connected to an output terminal of the second comparator 110. The SR flip-flop 150 can generate a gate driver control signal Vgd according to signals input through the set terminal S and the reset terminal R and output the gate driver control signal Vgd.

The slave gate driver 160 can generate a second gate control signal Vgs2 that controls turn-on/off of the slave switch 44 according to the gate driver control signal Vgd and output the gate driver control signal Vgd. When the gate driver control signal Vgd is a high-level signal, the slave gate driver 160 can generate and output a high-level second gate control signal Vgs2 for turning on the slave switch 44. When the gate driver control signal Vgd is a low-level signal, the slave gate driver 160 may generate and output a low-level second gate control signal Vgs2 for turning off the master switch 43.

Figure 4:
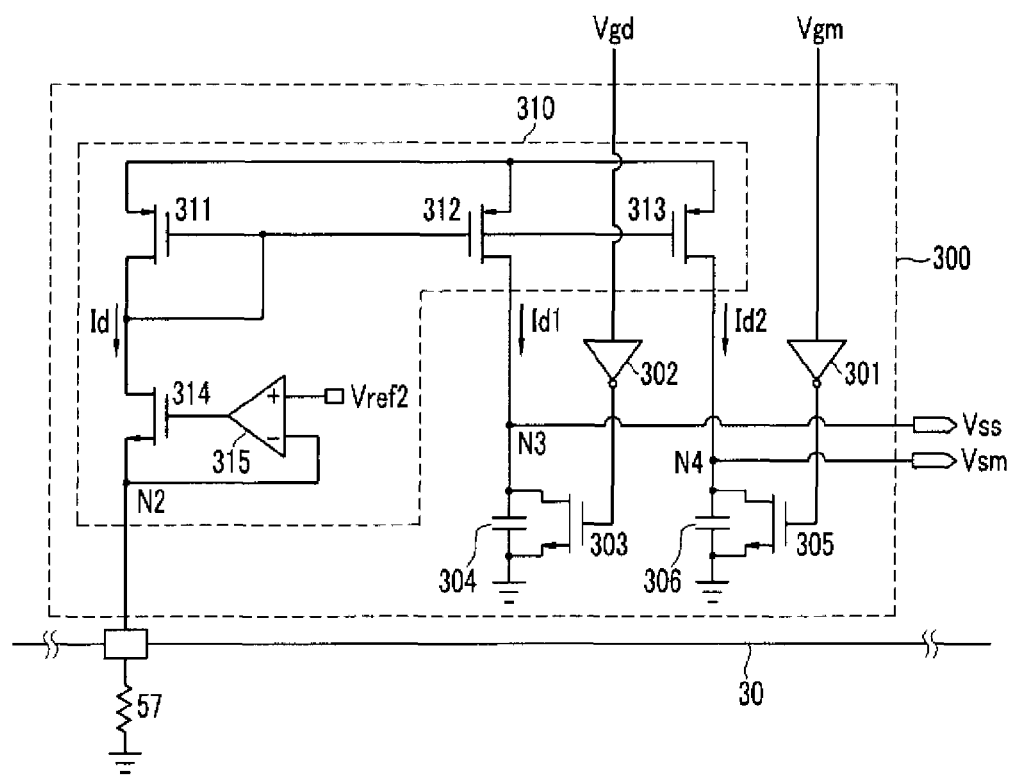
FIG. 4 shows a triangular wave generating unit 300 according to the exemplary embodiment of the present invention.

FIG. 4 illustrates an embodiment of the triangular wave generation unit 300.

The triangular wave generation unit 300 may generate the first triangular wave Vsm and the second triangular wave Vsm by using a current mirror circuit 310. The triangular wave generation unit 300 can include the current mirror circuit 310, inverters 301 and 302, NMOSFETs 303 and 305, and capacitors 304 and 306.

The inverter 301 can invert the level of the gate driver control signal Vgd and transmit the level-inverted gate driver control signal Vgd to a gate electrode of the NMOSFET 303.

The inverter 302 may invert the level of the gate driver control signal Vgm and transmits the level-inverted gate driver control signal Vgm to a gate electrode of the NMOSFET 305.

The current mirror circuit 310 can include a diode-connected PMOSFET 311, two PMOSFETs 312 and 313 each having a gate electrode connected to a gate electrode of the PMOSFET 311, an NMOSFET 314, and a comparator 315. A source electrode of the NMOSFET 314 can be connected to an inversion terminal (−) of the comparator 315 and a first terminal of the resistor 57, and a gate electrode thereof can be connected to an output terminal of the comparator 315. The comparator 315 can generate an output voltage according to a voltage difference between a reference voltage Vref2 applied to a non-inverting terminal (+) and a voltage of a node N2 that is input to the inverting terminal (−), and output the output voltage to the gate electrode of the NMOSFET 314. When the amount of drain current Id flowing through the NMOSFET 314 increases, the voltage at the node N2 increases and the output voltage of the comparator 315 decreases. Then, a voltage difference between the gate and source electrodes of the NMOSFET 314 decreases so that the amount of the drain current Id is reduced. Since the above operation can be performed within a very short period of time, the NMOSFET 314, the comparator 315, and the resistor 57 function as a constant current source that generates a current of constant intensity.

The drain current Id may flow to the diode-connected PMOSFET 311, and can be mirrored so that a current Id1 having a predetermined ratio of the drain current Id flows to the PMOSFET 312. The predetermined ratio can be determined in accordance with a ratio of a channel length and a channel width of the PMOSFET 312, and a ratio of a channel length and a channel width of the PMOSFET 311. A current Id2 can flow to the PMOSFET 313 determined by the same principles as of the PMOSFET 312.

When the gate driver control signal Vgd is a high level signal, the NMOSFET 303 can be in the turn-off state. Then, the capacitor 304 can be charged with the current Id1, and a voltage of the node N3 can be linearly increased with a slope that corresponds to the intensity of the current Id1. When the gate driver control signal Vgd is a low-level signal, the NMOSFET 303 can be turned on. When the NMOSFET 303 is turned on, the voltage of the node N3 can be grounded. When the gate driver control signal Vgd becomes the high level signal again, the NMOSFET 303 is turned off. Then, the voltage of the node N3 increases again. Since the second triangular wave Vss is the voltage as that of the node N3, the second triangular wave Vss is generated in the same manner as above.

When the gate driver control signal Vgm is a high level signal, the NMOSFET 305 can be in the turn-off state. Then, the capacitor 305 can be charged with the current Id2, and a voltage of a node N4 can be linearly increased with a slope that corresponds to the intensity of the current Id2. When the gate driver control signal Vgm becomes a low level signal, the NMOSFET 305 can be turned on. When the NMOSFET 305 is turned on, the voltage of the node N4 can be grounded. In addition, the NMOSFET 305 can be turned off when the gate driver control signal Vgm becomes the high level signal again. Then, the voltage of the node N4 is increased again. Since the first triangular wave Vsm is the voltage of the node N4, the first triangular wave Vsm can be generated in the same manner as above.

Figure 5:
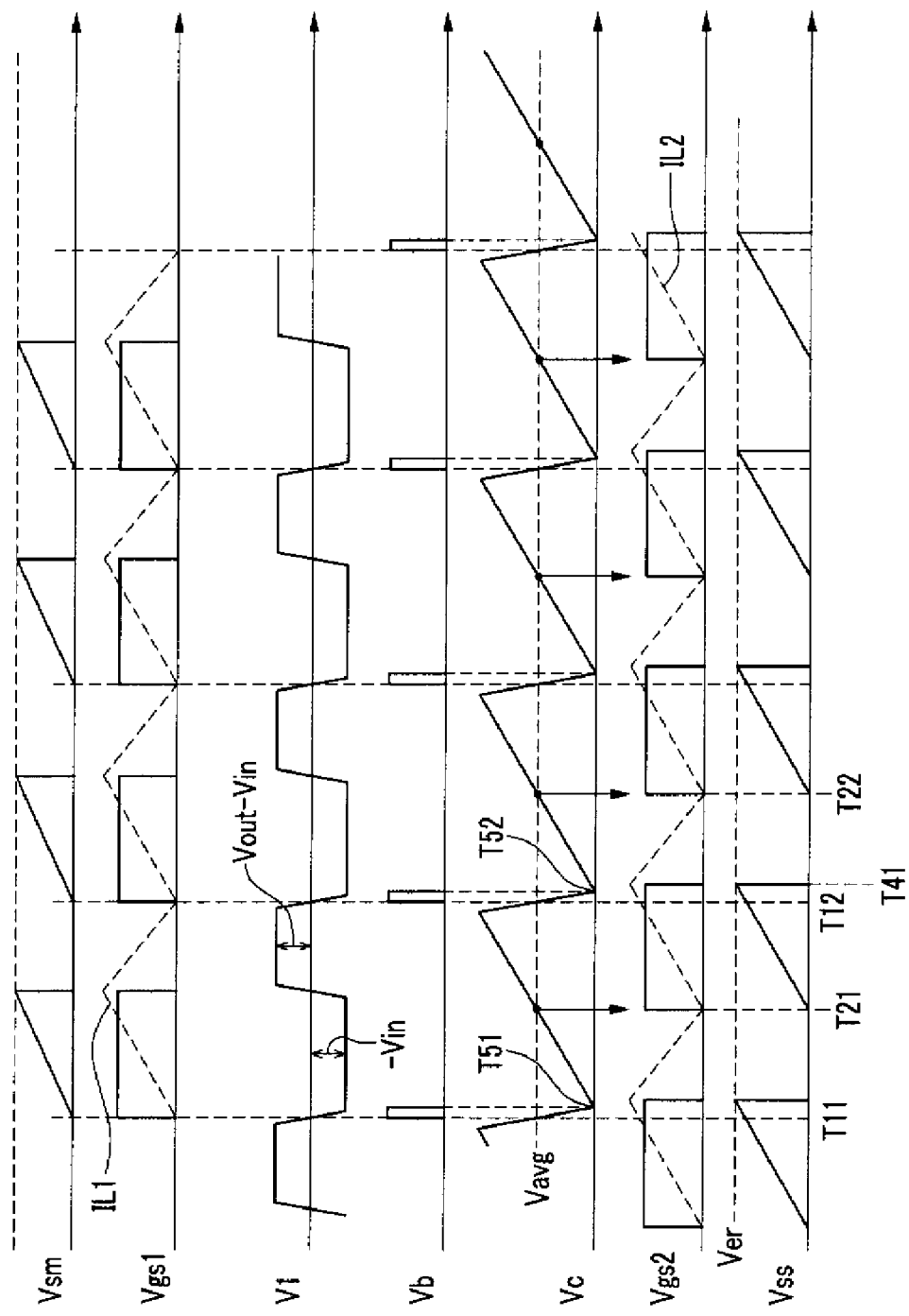
FIG. 5 shows an input signal, an output signal, and an internal signal of a switch controller of a converter according to an exemplary embodiment of the present invention.

FIG. 5 illustrates input, output, and internal signals of a switch controller of a converter. Referring to FIG. 5, a driving method of the converter will be also described.

At a time T11, the zero voltage detection unit 210 can transmit a high-level pulse signal to the OR gate 220 when a detection voltage V1 becomes zero. The OR gate 220 can forward a high-level pulse signal to the set terminal S of the SR flip-flop 250. At this time, a voltage of a triangular wave Vsm can be smaller than an error voltage Ver, and therefore a low-level signal can be input to the reset terminal R of the SR flip-flop 250. The SR flip-flop 250 may transmit a high-level gate driver control signal Vgm to the master gate driver 260. The first gate control signal Vgs1 can become a high-level signal. When the master switch 43 is turned on by the high-level first gate control signal Vgs1, the current IL1 of the first inductor 41 can be increased. The one-shot vibrator 120 can be synchronized by the high-level gate driver control signal Vgm and generate a high-level pulse signal Vb. Then, the NMOSFET 172 can be turned on, and a voltage of an internal triangular wave Vc may become a ground voltage. At a time T51, the NMOSFET 172 is turned off again, and the capacitor 173 can be charged with a current of the current source 171 so that the voltage of the internal triangular wave Vc increases.

At a time T21, the comparator 140 may transmit a high-level voltage signal to the set terminal S of an SR flip-flop 150 when the voltage of the internal triangular wave Vc reaches an average voltage Vavg. At this time, the voltage of a second triangular wave Vss can be smaller that the error voltage Ver, so a low-level signal can be input to a reset terminal R of the SR flip-flop 150. Then, the SR flip-flop 150 can transmit the high-level gate driver control signal Vgd to the slave gate driver 160. The second gate control signal Vgs2 then can become a high level signal. When the slave switch 44 is turned by the high-level second gate control signal Vgs2, the current IL2 of the second inductor 42 can be increased.

When a signal with a frequency is low-passed, a high-frequency component is removed and only a low-frequency signal is passed. When a triangular wave signal is low-passed, only a low-frequency band signal is passed. This low-frequency band signal is an average value of the triangular wave signal. Since the triangular wave is triangle-shaped, the average value of the triangular wave equals half of the peak of the triangular wave. Based on this, embodiments of the present converter can predict a turn-on point of the slave switch 44. That is, since the average voltage Vavg may equal a center, or average value of the internal triangular wave Vc and the internal triangular wave Vc linearly increases during one period of the internal triangular wave Vc, a crossing point of the average voltage Vavg and the internal triangular wave Vc can correspond to a center point of one period of the internal triangular wave Vc. The one period of the internal triangular wave Vc can correspond to one switching operation period of the master switch 43, and therefore the switching operation of the slave switch 44 can have a phase difference of approximately 180 degrees with the switching operation of the master switch 43.

At a time T31, a first comparator 240 may transmit a high-level signal to the reset terminal R of the SR flip-flop 250 when a voltage of the first triangular wave Vsm reaches the error voltage Ver. The SR flip-flop 250 can generate a low-level gate driver control signal Vgm according to the high-level signal, and transmit the low-level gate driver control signal Vgm to the master gate driver 260. Then, the master switch 43 can be turned off and the current IL1 is decreased. During a time T11 to a time T31, the detection voltage V1 can have a voltage having an inverted polarity of an input voltage Vin. When the master switch 43 is turned off at the time T31, a voltage generated by subtracting an output voltage Vout from the input voltage Vin can be inducted in the first inductor 41. Since the detection voltage V1 has an inverted polarity with respect to that of the voltage inducted to the first inductor 41, the detection voltage V1 can correspond to a voltage generated by subtracting the input voltage Vin from the output voltage Vout.

At a time T41, when the voltage of the second triangular wave Vss reaches the error voltage Ver, a second comparator 110 may transmit a high-level signal to the reset terminal R of the SR flip-flop 150. The SR flip-flop 150 can generate the gate driver control signal Vgd according to the high-level signal, and transmit the gate driver control signal Vgd to the slave gate driver 160. Then, the slave switch 44 can be turned off, and the current IL2 can be reduced.

The first inductor current IL1 can be reduced so that no more current flows, so a voltage difference between the terminals of the first inductor 41 becomes zero. At this time T12, the detection voltage V1 also becomes zero. The system operates after time T12 the same way it operated after time T11. The NMOSFET 172 can be turned on at time T12 so that the capacitor 173 is discharged to a ground voltage for a predetermined time period. The NMOSFET 172 can be turned off at a time T52 so that the internal triangular wave Vc increases.

The first inductor 41 and the second inductor 42 can have the same input voltage Vin since they are connected in parallel, and therefore the first inductor current IL1 and the second inductor current IL2 can increase or decrease with the same slope since the first inductor 41 and the second inductor 42 have the same inductance. If a ratio of a channel width and a channel length of the PMOSFET 312 equals a ratio of a channel width and a channel length of the PMOSFET 313, current Id1 and current Id2 can be the same. In addition, when the capacitor 304 and the capacitor 305 have the same capacitance, the first triangular wave Vss and the second triangular wave Vsm can take the same amount of time to reach the error voltage Ver from the ground voltage. Since the first and second triangular waves Vsm and Vss start to increase after the master switch 43 and the slave switch 44 are respectively turned on, it takes essentially the same amount of time for the first and second triangular waves Vsm and Vcc to reach the error voltage. Accordingly, a turn-on period of the master switch 43 can be the same as that of the slave switch 44. Then, the master switch 43 and the slave switch 44 may have the same switching operation period and the same turn-on period, and accordingly, they have the same turn-off period. In addition, the first and second inductor currents IL1 and IL2 can decrease with the same slope, and accordingly, the second inductor current IL2 that has started to decrease at a time T12 becomes zero at a time T22. At the time T22, the average voltage Vac and the internal triangular wave Vc can be the same and the slave switch 44 is turned on. That is, the slave switch 44 can be turned on when voltages between the terminals of the second inductor 42 become zero.

Embodiments of the converter can repeat periodically the above-described operation.

Figure 6:
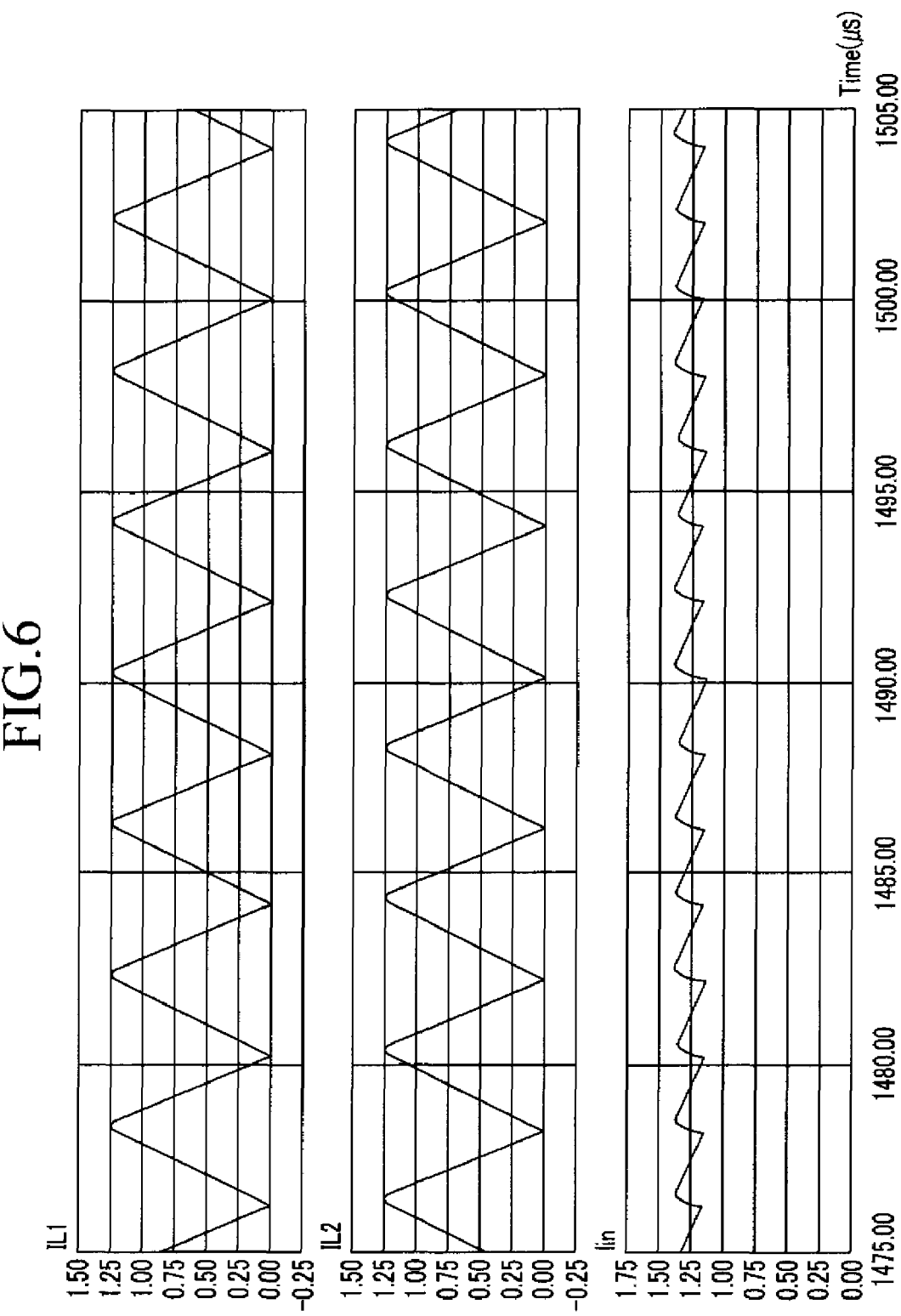
FIG. 6 shows a first inductor current IL1, a second inductor current IL2, and an input current Iin of the converter according to the exemplary embodiment of the present invention.

FIG. 6 shows the first inductor current IL1, the second inductor current IL2, and the input current Iin of the converter in some embodiments. A waveform of the input current Iin can be the same as a sum of waveforms of the first and second inductor currents IL1 and IL2. In FIG. 6, the horizontal axis denotes time.

The first inductor current IL1 and the second inductor current IL2 can have a phase difference of approximately 180 degrees because the master switch 43 and the slave switch 44 respectively perform switching operations with a phase difference of approximately 180 degrees.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A converter comprising:
a first inductor;
a second inductor;
a capacitive element;
a master switch for transmitting a current flowing through the first inductor to the capacitive element according to a master switching operation;
a slave switch for transmitting a current flowing through the second inductor to the capacitive element according to a slave switching operation; and
a switch controller for controlling the switching operation of the master switch and the slave switch,
wherein the switch controller comprises
a master controller for controlling the switching operation of the master switch, and
a slave controller for controlling the switching operation of the slave switch,
wherein the slave controller detects a center point of one switching operation period of the master switch by using an internal triangular wave that has the same period as the switching operation period of the master switch, and turns on the slave switch at the detected center point.

2. The converter of claim 1, wherein the center point is a crossing point, at which time the slave controller detects a crossing of an average value of the internal triangular wave and the internal triangular wave.

3. The converter of claim 2, wherein the slave controller calculates the average value by low-pass filtering the internal triangular wave.

4. The converter of claim 1, wherein the master controller generates a detection voltage by detecting a voltage across the first inductor, turns on the master switch when the detection voltage falls below zero, calculates an error voltage by comparing a division voltage that corresponds to a voltage of the capacitive element and a predetermined reference voltage, and turns off the master switch when a first triangular wave having a same period as a master switching period reaches the error voltage.

5. The converter of claim 4, wherein the switch controller further comprises:
an error voltage generation unit for amplifying a difference between the reference voltage and the division voltage with a predetermined gain and outputting the amplified result; and
a triangular wave generation unit for generating the first triangular wave,
wherein the triangular wave generation unit generates the first triangular wave that starts to increase synchronously with the master switch being turned on.

6. The converter of claim 4, wherein the master controller comprises:
a zero voltage detection unit receiving the detection voltage and detecting a time when the detection voltage falls below zero, and generating a high-level pulse at the detected time;
a logical operation unit receiving an output signal of the zero voltage detection unit and outputting a signal of a level that corresponds to the output signal of the zero voltage detection unit;
an SR flip-flop having a set terminal to which the output signal of the logical operation unit is input and a reset terminal to which an output signal that corresponds to a result of the comparison between the first triangular wave and the error voltage is input, and generating a first gate driver control signal according to the signals input to the set terminal and the reset terminal; and
a master gate driver for generating a first gate signal that controls turn-on/off of the master switch according to the first gate driver control signal.

7. The converter of claim 6, wherein the master controller further comprises a first comparator having a non-inversion terminal to which the first triangular wave is input and an inversion terminal to which the error voltage is input.

8. The converter of claim 4, wherein the internal triangular wave has a waveform that varies within one period, and the slave controller detects a crossing time point of an average value of the internal triangular wave and the internal triangular wave as the center point of one switching operation period of the master switch.

9. The converter of claim 8, wherein the slave controller calculates the average value by low-passing the internal triangular wave.

10. The converter of claim 9, wherein the slave controller turns on the slave switch at the crossing time point of the average value of the internal triangular wave and the internal triangular wave, compares a second triangular wave having a period same as switching period of slave switch and the error voltage, and turns off the slave switch if the second triangular wave reaches the error voltage.

11. The converter of claim 10, wherein the switch controller further comprises:
an error voltage generation unit for amplifying a difference between the reference voltage and the division voltage with a predetermined gain and outputting the amplified result; and
a triangular wave generation unit for generating the second triangular wave,
wherein the triangular wave generation unit generates the second triangular wave that is synchronized when the slave switch is turned on and starts to increase.

12. The converter of claim 10, wherein the slave controller comprises:
a one-shot vibrator synchronized by the first gate driver control signal that turns on the master switch for generating a pulse signal;
an internal triangular wave generation unit synchronized by the pulse signal of the one-shot vibrator for generating the internal triangular wave that increases for one switching operation period of the master switch;
a low-pass filter calculating the average value of the internal triangular wave value by loss-passing the internal triangular wave;
a second comparator outputting a first-level signal if the internal triangular wave crosses the average value;
an SR flip-flop having a set terminal to which an output signal of the second comparator is input and a reset terminal to which an output signal that corresponds to a result of the comparison between the second triangular wave and the error voltage is input, and generating a second gate driver control signal according to the signals input to the set terminal and the reset terminal; and
a slave gate driver generating a second gate signal that controls turn-on/off of the slave switch according to the second gate driver control signal.

13. The converter of claim 12, wherein the one-shot vibrator comprises:
a transistor having a gate electrode to which the first gate driver control signal that turns on the master switch is input;
a capacitor connected in parallel with a drain and a source electrodes of the transistor; and
a constant current source that supplies a current to the capacitor.

14. The converter of claim 12, wherein the slave controller further comprises a second comparator having a non-inverting terminal to which the second triangular wave is input and an inverting terminal to which the error voltage is input.

15. A driving method of a converter that includes a first inductor, a second inductor, a capacitive element, a master switch that transmits a current flowing through the first inductor to the capacitive element according to a switching operation, and a slave switch that transmits a current flowing through the second inductor to the capacitive element according to a switching operation, the driving method comprising:
generating an internal triangular wave having a period that is the same as one switching operation period of the master switch;
detecting a center point of the one switching operation period by using the internal triangular wave; and
turning on the slave switch at the detected center point.

16. The driving method of claim 15, wherein the internal triangular signal has a waveform that varies within one period, and
the detecting of the center point of the one switching operation period comprises detecting a crossing point of an average value of the internal triangular wave and the internal triangular wave.

17. The driving method of claim 16, wherein the detecting of the center point of the one switching operation period further comprises calculating the average value by low-passing the internal triangular wave.

18. The driving method of claim 15, further comprising:
generating a detection voltage by detecting a voltage induced across the first inductor, and turning on the master switch when the detection voltage falls below zero;
calculating an error voltage by comparing a division voltage that corresponds to a voltage of the capacitive element and a predetermined reference voltage; and turning off the master switch when a first triangular wave having a same period as the master switch switching period reaches the error voltage.

19. The driving method of claim 18, further comprising generating the first triangular wave that is synchronized and starts to increase when the master switch is turned on.

20. The driving method of claim 18, wherein the internal triangular wave has a waveform that varies within one period, and the detecting of the center point of the one switching operation period comprises detecting a crossing point of an average value of the internal triangular wave and the internal triangular wave.

21. The driving method of claim 20, wherein the detecting of the center point of the one switching operation period further comprises calculating the average value by low-passing the internal triangular wave.

22. The driving method of claim 21, further comprising:
turning on the slave switch at the crossing point of the average value of the internal triangular wave and the internal triangular wave; and
comparing a second triangular wave having a same period as slave switching period and the error voltage, and turning off the slave switch when the second triangular wave reaches the error voltage.

* * * * *